May 6, 1958  L. C. JOHENNING  2,833,086
TURKEY CALLER
Filed Aug. 2, 1955
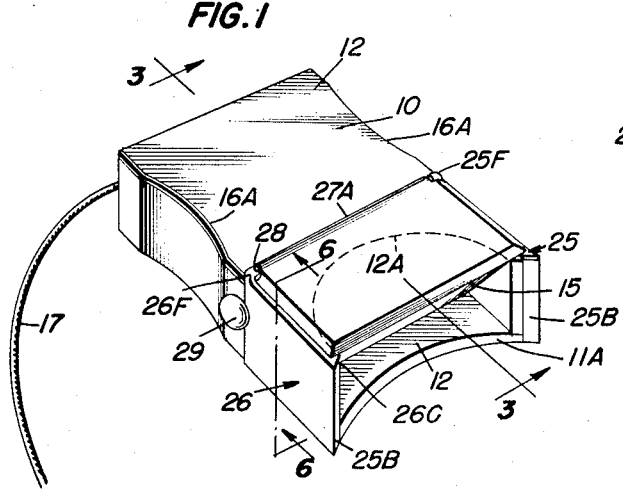
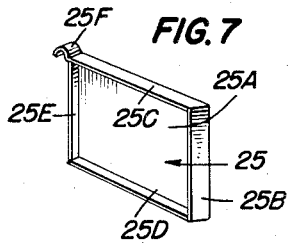
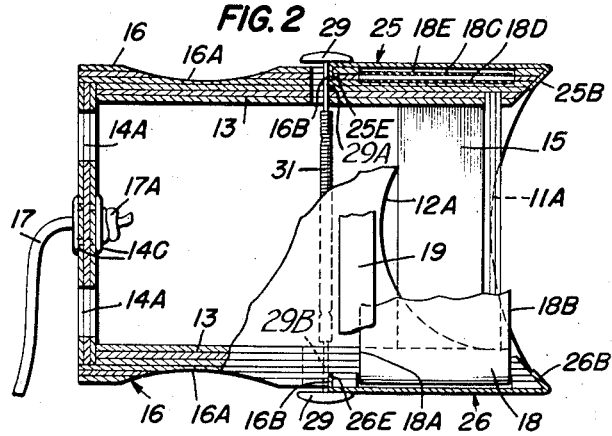
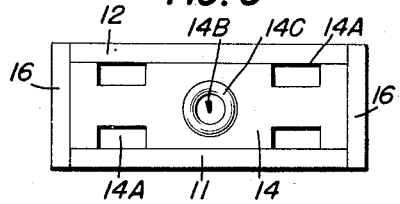
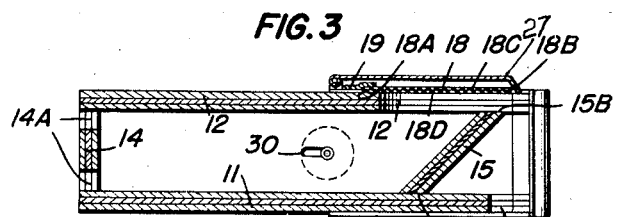
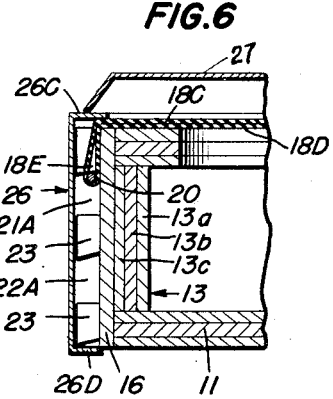
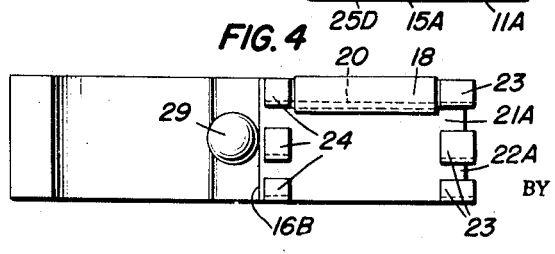
INVENTOR
LEON C. JOHENNING
BY
ATTORNEY

United States Patent Office 2,833,086
Patented May 6, 1958

2,833,086

TURKEY CALLER

Leon C. Johenning, Lexington, Va.

Application August 2, 1955, Serial No. 525,961

13 Claims. (Cl. 46—180)

My invention, relating broadly to the general classification of bird callers, more particularly concerns mouth-operated callers for migratory and wild game birds, particularly wild turkeys.

An object of my invention is to provide a generally box-shaped caller having an enclosed and fixed air column, capable of producing a wide variety of calls all characteristic of the particular game bird being sought, with subtle overtones varying flexibly in frequency and widely in duration and modulation, all closely responding to the natural calls employed in the field by the particular game bird being simulated, here the wild turkey; the caller itself being characterized by its inherent simplicity accompanied by its readiness and ease of use by the veriest tyro, and these under wide extremes of adverse weather conditions.

Another object is to provide a bird caller of the general type described which is at once compact, sturdy, reliable and certain in operation, with ready response to the fundamental calls of the particular migratory or game fowl for which it is intended, whereby the fundamental call of the latter can be readily repeated any desired number of times, all with requisite assurance of certainty, ease and comfort on the part of the operator, and with ready achievement of all essential variations and departures from the fundamental tone of the call of the wild turkey or other game fowl, as the case may be, which are requisite for faithful duplication of the particular call which is being reproduced.

Yet another object is to provide a multi-tone, mouth-operated bird caller which can be readily operated by the user despite any serious irregularity which he may have in tooth formation.

Other objects and advantages will in part be obvious and in part more fully pointed out hereinafter during the course of the following description, particularly when construed in the light of the disclosure of the accompanying drawings.

Accordingly, my invention may be considered to reside in the several component elements, parts and features of construction, and in the interrelation and mutual combination of each of the same with one or more of the others, the scope of the application of all of which is more fully set forth in the claims at the end of this specification.

In the several views of the drawings, wherein I have disclosed that embodiment of my invention which I prefer at present, Figure 1 is a perspective view of an assembled caller, with securing cord attached thereto, with bottom side displaced uppermost for ready showing of essential details;

Figure 2 is a horizontal, longitudinally-sectioned view of the completed caller, as viewed from the bottom side of the caller, looking toward that side which is topmost in use;

Figure 3 is a vertical, longitudinal-sectional view of such caller, taken on the line 3—3 in Figure 1 and looking in the direction of the arrows, that side which is bottommost in use being shown topside, i. e. the caller is inverted, for ready understanding of structural details;

Figure 4 is a side elevation of the caller with cover removed in order to show the thin, flexible diaphragm of rubber or the like, and with the bottom of the caller disposed uppermost;

Figure 5 is an inverted end view of the caller;

Figure 6 is a fragmentary, transverse vertical section of the caller, again with the caller inverted, and taken on the line 6—6 in Figure 1 and looking in the direction of the arrows thereof; while Figure 7 discloses an end plate comprising part of a protective cover for the caller, in use fitting over the membrane on the underside of the caller, and which end plate terminates at one end in an open sleeve adapted to have journalled therein the hinge pintle of the main cover plate itself.

Throughout the several views of the drawings like reference characters denote like structural parts.

And now, as conducive to a more ready and thorough understanding of my invention, it may be noted that increasing importance, particularly from a recreational standpoint, attaches to hunting and shooting game fowl. This is particularly so as concerns wild turkeys. Experience has long demonstrated that in field work related to such hunting and effectively employed, the close, accurate and faithful simulation of the calls of the bird being hunted materially improves the likelihood of enticing such game within effective gun-range. For example, it is well recognized that once a flock of wild turkeys is flushed and scattered, then the individual birds, components of the flock, undertake to re-assemble as a group. They find each other and re-unite through the use of a series of calls which they emit and replies which they make. Nearly all of those respond to a certain characteristic or fundamental tone. Conveniently, we call this a carrier tone. The particular call will depart somewhat from this fundamental or carrier tone in certain important respects such as duration and overtones, comprising trills and the like, depending upon the particular purpose-call which is being emitted. To illustrate, such call may be judiciously selected from the characteristic yelps, clucks, chirps, putts, "kee-kee" and whines of both sexes, for both young and old birds, or may be an effective combination of two or more such calls.

It has long been recognized that, if only some means be provided for closely duplicating these calls the hunter, hidden in the brush, can set himself up as the focal point about which the various birds will re-assemble into a flock. And in so doing, the turkeys will be brought within gun range. Accordingly, considerable attention has long been directed towards providing a suitable turkey caller which it will lend itself readily to close duplication of the various calls of the turkey.

Now, to be effective for its intended purpose, such caller must respond to certain basic requirements. Illustratively it must be light and compact, yet sturdy. It must be reliable in operation under all extremes of weather conditions. Thus such reliability must be faithfully displayed in extremely cold and falling weather, with either rain or snow; and this, no matter how thoroughly the operator himself may be chilled immediately prior to using the caller. It must be capable of being effectively employed after a minimum of practice. A duality of function must reside in (1) the certainty of repetition, with surety, ease and comfort and over and over again, of the funlamental carrier tone, and (2) all this coupled with effective modulation of the carrier tone, imposing overtones thereon so as to duplicate faithfully different sounds or notes, which vary amongst themselves in required important respects as concerns duration, trills, overtones and the like; all this while permitting ready, certain and accurate duplication of the several calls of the particular bird.

That heretofore and generally, wide-spread demand for an effective bird caller has existed is clearly demonstrated by the substantial measure, both in number and variety, of bird callers available on the market. Not only is this spread of callers wide in market coverage, but in the variety thereof which are available. Generally speaking, however, the known and available callers separate among themselves and fall into two main classes or categories. Either these callers are of the mouth-opereated type or they are of the box types.

Considering first the mouth-operated class, typical of these are the wing-bone or green-leaf type.

These are extremely unreliable and uncertain in operation and can be used only by the experienced and skilled operator.

As to the so-called box-type caller, comprising the second classification of bird callers, as a group these have the disadvantage that, if operable at all, only a fixed, fundamental tone signal can be achieved by their use. Usually these box-type callers are operated by hand. They will produce but a single tone call.

For one reason or another, therefore, the known turkey callers have fallen signally short of requisite success.

An object of my invention, therefore, is to avoid in substantial measure the many disadvantages and defects heretofore confronting the art, and at the same time to produce a box-type caller operated principally by the mouth of the user and which, simple in construction and design, low in cost and small and compact in configuration, effectively employs a single and fixed air column or sound chamber in manner such that the latter closely and flexibly responds to mouth manipulation to produce a wide variety of calls of turkey or generally similar wild fowl, all with ready and faithful reproduction of such calls under all extremes of operating conditions.

And now, having reference to the construction as disclosed in the several views of the drawings, and with caller shown inverted for clarity and readiness of disclosure, an essential component of my new caller is the fabricated, and generally rectangular, relatively shallow and elongated box-like structure indicated generally at 10 (Figure 1). A certain degree of criticality attends the proper dimensioning of this box, to achieve with certainty the fundamental tone of the call of the wild turkey or other game fowl being simulated, and on which fundamental tone thus produced, requisite overtones may be superimposed. Moreover, the dimensioning of this box-like structure 10 must be such that the device fits nicely and readily into the hands of the user. This dimensioning is arrived at imperically, such as to achieve proper fundamental tone. In a typical instance and with moderate criticality, the box structure 10 has a length of approximately 2¾ inches, an over-all width of just short of 2 inches, say 1¾ inches, and a depth of approximately ¾ of an inch, i. e. the relation of length to width to depth is about 11 x 7 x 3. While this box may be formed of a wide variety of materials, any of which are generally suitable for such purpose, I prefer to form it of wood. This is because of the mellow and comparatively sweet tone which, generally, inherently attends the use of such material. Moreover, wood can be handled with comparative readiness. Where wood is used, and having particular reference to the disclosure of Figure 1, I provide top and bottom faces 11 and 12, respectively, joined by side rails 13, 13. Box-like structure 10 is closed at its end remote from the mouth orifice by back member 14.

As to the back member 14, I find that an end closure of sorts must be provided, closing the caller to at least a certain extent. For my experiments have conclusively demonstrated that should the end be left open in its entirety, satisfactory sound results are not achieved.

The front or mouth end of the structure 10 is partly closed by a sharply angled tongue or anvil 15, as best shown in Figure 3.

Side rails 13, 13 top and bottom faces 11, 12, are secured together in any suitable manner, preferably and in the instant instance, by gluing. The back member 14 is applied in similar manner. In the embodiment illustrated, anvil 15 is mitered into the side rails 13, 13. Preferably I provide the side rails 13, 13 with reinforced backings indicated generally in Figure 2 at 16, 16. These backings 16, 16 not only serve to bolster and reinforce the box structure 10, imparting added rigidity thereto, but as well, they effectively provide thickness for certain structural purposes hereinafter to be described.

I have referred to the box structure 10 as preferably being formed from carefully selected woods. In such preferred embodiment, I find it advantageous, for a number of reasons, to employ three-ply wood. When this is done, and having particular reference to the left-hand end of Figure 6 as a purely typical illustration, the side rail 13 is comprised of an inner ply 13A of soft wood, of which gum is typical, a middle layer of dark-colored wood 13B such as mahogany, and an outer strip 13C of hard wood such as maple. The soft wood inner ply 13A imparts mellow tone; the dark wood middle ply 13B, of mahogany or the like, serves as a marking strip; while the outer ply 13C, of maple or the like, imparts requisite hardness and strength to the composite, plywood rail. Not only is pleasing tone imparted through the use of such plywood, but as well, added strength is achieved with minimum thickness and maximum lightness of the resulting product.

Where desired, however, I may employ other suitable materials of which plastic, hard rubber, and generally similar products are but typical. In large measure, such materials have some advantage over the use of plywood or other fabricated structure, in that they lend themselves readily to the production of a molded product. Extrusion or other molding can be resorted to, to provide box and anvil in single piece, all nicely dimensioned, proportioned and contoured. Accordingly, such product can be produced in quantity at somewhat lower unit cost than the fabricated structure here disclosed. However, I find that the use of wood imparts a superior tone to the resulting product, perhaps more closely responding to the exact call of the game bird for which my caller is designed.

As shown in the inverted views disclosed in Figures 1 and 2 I prefer to provide shallow, hand-gripping concavities 16A, 16A across the exterior of backings 16, 16 in that region of the box structure 10 which is outermost and remote from the user's mouth. These concavities serve effectively to provide firm hand hold for the user, for gripping the caller in the palm of the hand, and permitting tight and ready finger retention. Thus the back or butt of the palm of the hand of the user, upon gripping the caller, is brought almost automatically into position for effectively masking the air-admitting openings 14A which I provide in the back member 14 of back structure 10. By properly manipulating the palm of his hand over these air-admitting openings 14A, 14A, the hunter can effectively modulate the harmonies superposed on the carrier characteristic of the calls which he emits through his use of the caller.

As to the precise configuration of these openings 14A, 14A, I here disclose them as being generally rectangular in shape, four in number, and symmetrically disposed with respect to the center and outer margins of the back member 14. Thus, with especial reference to the disclosure of Figure 5, these four openings 14A are disposed one in each quadrant as referred to the center of the back member 14 as a focal or reference point. These openings 14A of course may have any other suitable size, number and configuration, for basically, it is essential only that they define interstices or openings which will permit the ample influx or intake of air as the user applies his lips to and draws air into the mouth through the box-like structure 10. However, I have elected the use of four such openings 14A, positioned and proportioned generally as in Figure 5, because I find them to provide effective and uniform distribution of the air or sound.

It will be seen that at the center of the back member 14 I provide an aperture of approximately one-quarter inch diameter. This opening is indicated generally at 14B in Figure 5. Through this aperture 14B I slip a cord 17, knotting or otherwise securing the same at 17A on the inner side of back member 14, within the interior of the box structure 10. Conveniently this cord 17 is inserted, and the knot 17A formed, during fabrication, and before top face 12 is applied and glued or otherwise secured in place. Cord 17 serves as a safety or loss-proof carrier for the bird caller, and may be fixed to a lapel opening or other similar anchoring member on the hunter's shirt or jacket.

Because of the substantial chafing which quite likely occurs with the caller thus in service, and which will take place between the cord 17 and the wooden back member 14 defining the opening 14B, and to impart increased wear-resisting qualities to the structure in this region, I provide reinforcing eyelet 14C of metal or the like, lining the margins of the opening 14B and directly receiving the chafing and rubbing of cord 17. This eyelet 14C serves as a wear plate so that minimum wear is experienced. The eyelet 14C may be crimped or otherwise provided and secured in the back member 14.

From the foregoing, it may be seen that I have provided a box-like structure 10 which, with fixed sound chamber properly manipulated and in certain and predictable manner, will insure the production of a basic tone which responds closely to the fundamental call of the game fowl for which it is intended, typically a wild turkey. On this fundamental tone, and in manner already pointed out generally and through effective modulation, suitable overtones and variants of fundamental call can readily be achieved, closely and almost indistinguishably simulating the calls of the wild turkey.

To operate the tonal chamber defined by box 10, a moving column of air, drawn in through the openings 14A, must be vibrated therein. I will now describe the mode of vibrating this tonal chamber and as well, the structure which permits this excitation.

As heretofore stated, I close the box-like structure 10 by a sharply-angled tongue or sound anvil or the like, indicated generally at 15. I determine the precise angle at which this anvil is set in an imperical manner. And I find this angle to be somewhat critical. For precise understanding, assume top face 11 of box 10 (shown bottommost in Figure 1, for ready understanding) as comprising a datum and as being disposed uppermost when the caller is being used. With such orientation, it will be found (see Figure 3) that the anvil 15 is slanted downwardly and forwardly in the direction of the mouth of the user and this, at an angle of just about 47° to the said top face 11. As stated, this angle is relatively critical. I dispose the back edge of anvil 15, abutting the inner surface of the top face 11, about one-half inch rearwardly of the front surface of the caller. For clarity, it will be recalled that this is the surface which, when the caller is in use, is adjacent the mouth of the user. The tapered or mitered front edge 15B of this anvil 15 terminates just short of the front end of the caller, at the bottom surface thereof and at a depth of about one-sixteenth of an inch from this front edge. This design is fully disclosed in Figure 3, particularly when this view is considered along with the disclosure of Figures 1 and 2.

In my researches I found that with angle α fixed at 47° as concerns orientation of anvil 15, this latter can be comfortably received within the mouth of the operator, while permitting the caller itself to be held in natural and normal position. I observed that sensitivity and control of the emitted sound increased as the critical angle of 47° was approached. It is of course apparent that other angles of orientation of this anvil will result in production of sound, and this is not necessarily unpleasing, but it has been my observation that this angle of 47° appears to be that which is most useful and practical.

As concerns the operation of the diaphragm 18, later to be described in greater particularity, in vibrating against the tongue or anvil 15, the criticality of this angle α at which the anvil is set (47°) can be appreciated. Particularly is this apparent when it is first understood that the audible and significant sound or call is emitted as a result of the vibrating diaphragm 18 coming into contact with the sharply angled bottom edge of the tongue 15, when the air is drawn in one direction. When the operator attempts to blow outwardly through the caller 10, the diaphragm 18 is simply locked against the anvil, and no useful sound results.

Now having particular reference to the disclosure of Figures 1 and 2, and as well to that of Figure 3, it will be seen that the front end of the bottom face 12 (topmost in Figure 3) and, which in use is disposed adjacent the mouth of the user, is provided with a concave, nearly semi-circular recess 12A struck on a radius about half the width of the caller. This provides a deep indentation, which serves for the ready reception of the mouth of the user. This nearly semi-circular recess or opening 12A extends almost completely across the caller 10, terminating at the inner margins of side rails 13, 13. The exact dimensions of this recessed opening as to width and depth are empirically determined for most comfortable reception in the mouth of the user.

Additionally, I provide a concave recess 11A in the top face 11 of the box-like structure 10. This recess 11A, just as does concave recess 12A, extends completely across the width of the top face 11. This recess, however, extends to the outer margins of the side rails 13, 13, for better fit to the user's lip, as well as for structural purposes. Here again the empirically selected dimensions of the recess are chosen with the view of most comfortably accommodating the top front portion of the caller against the upper lip of the operator.

I have previously stated that a vibrating element is essential to the proper functioning of my caller. This diaphragm, comprising a membrane, is stretched across and cooperates with anvil 15. To this end it is stretched across and closes the opening defined by the concave recess 12A in the bottom face 12. In use, this membrane is vibrated against the exposed edge 15B of the sound anvil 15. To this end I employ a double fold of extremely thin rubber or other plastic or flexible material, slightly stretched across this opening 12A, in close but definite spatial relation to the working surface of this anvil 15. This diaphragm 18 is securely mounted in position and made fast, at its outer longitudinal end 18A, remote from the mouth of the user, and extending transversely across the caller 10, by suitable means such as a strip 19 of Scotch tape or generally similar and suitable permanent adhesive strip.

In a typical illustration, a single thickness 18C or 18D of the rubber membrane employed may be approximately 0.0003 inch in thickness. While other thicknesses give quite satisfactory results, I prefer to employ membranes of the approximate thickness indicated. Usually I impart to this membrane a width or depth of approximately ⅞ of an inch, when in repose.

The ⅞ inch width of the rubber diaphragm 18 is not necessarily critical, but this width is found to give good tone quality and provides ample lip area within the operator's mouth, for better control of sound produced. With diaphragm 18 properly positioned, extending completely across the length of the anvil 15, this diaphragm covers approximately 1/16 of an inch of the depth of the tongue or exposed area 15B of this anvil. Should the contact area against which the diaphragm vibrates be too small, a light, high-pitched tone will result, while if too great an area of the anvil is contacted, the resulting sound will be sluggish and pitched too low.

My observations concerning the thickness of the working edge 15B of the tongue or anvil 15 results in the conclusion that a thickness varying from about 1/12 to about 1/16 of an inch produces most desirable results, and provides the vibrating diaphragm 18, later to be described, with sufficient surface against which to strike. Variations in the thickness of this contact area produce some changes in the resulting sound. Should the tongue or anvil be too thick the operator encounters a feeling of clumsiness and sluggishness in operation, interfering with the user's efforts to produce a good note which is clear and true. Perhaps this unsatisfactory phenomenon attends upon bringing too great an area of the diaphragm into contact with the anvil. Should however, the anvil 15 be too thin then diaphragm 18 quite likely will strike against the tongue and continue on past the contact area, resulting in undesirable overtones which interfere with smooth vibration and attendant pure sound.

In quite similar manner the space, in repose, between diaphragm 18 and anvil 15 is found to rest within the range of 1/12 to 1/16 of an inch for best practical results. Accordingly, this dimension is critical at least to a certain extent. For should lesser spacing exist, the vibrations are shortened in length since the diaphragm does not have sufficient space for pulsation relative to the anvil. On the other hand, should this air-gap be increased then the operator draws in too great a quantity of air in through the opening between the diaphragm 18 and anvil 15, and this either without causing vibration, or with vibration only sluggishly produced and with resulting sound of wave length too great for satisfactory results. Moreover, an unpleasant stinging sensation may be encountered on the lip of the operator.

In research, my efforts were directed towards enclosing the sound or noise of the vibrating diaphragm within the sound chamber defined by box 10, and thereupon experimentally modulating the shape and size of this fixed chamber until the sound emitted closely resembles that of the required game, here the wild turkey.

Because variation in throat and mouth cavity area of the operator produces corresponding change in the overtones produced by the caller, it is obvious that the resonating chamber within the operator's mouth and throat either adds to or supplements that of the caller itself.

The large bottom opening 12A permits the mouth of the operator to cover a larger area of the diaphragm 18 than otherwise would be possible. This gives him superior control of the sound, with better "feel" of the diaphragm against his lip. More room is achieved for lip action in loosening or tightening the diaphragm.

Reference to Figure 3 clearly discloses that the ends of the anvil 15 are nicely mitered as at 15A and 15B, into the top and bottom faces 11, 12, respectively, of the box 10. This mitered end 15B is disposed over the entire length of anvil 15 and therefore extends across nearly the entire width of box 10, in spaced and facing relation to the diaphragm 18. And it is here that the mahogany center ply of the three-ply material from which anvil 15 is formed is particularly effective in use. The better to understand this, consider that for proper operation the front end or edge 18B of the rubber diaphragm 18 (it will be recalled that this front edge 18B is disposed closest the mouth of the operator when in use) must be centered in nicely mitered and spaced relation with the center of the mitered end 15B of the anvil 15. To achieve this centering in ready and simple manner, I stretch the diaphragm 18 across the concave recess 12A, arranging its inner edge 18B, 18B opposite the red-colored center or mahogany ply of the exposed end 15B of anvil 15. When this positioning is achieved, I find from experience that best tone qualities are obtainable, and this, in nearly automatic manner. And I thereupon seal the outer edge 18A of the rubber diaphragm 18 fast to the exterior of box 10 through the use of adhesive strip 19.

With the space between the diaphragm 18 and the tongue or anvil 15 approximating 1/16 of an inch, it will be seen that this diaphragm can vibrate along the entire edge of the anvil 15 and may be pressed closer thereto as required, through the action of and pressure applied by the lower lip against the diaphragm. This action and this variation in pressure is applied by the operator while undertaking to make the particular call which he desires. With diaphragm vibrating within the operator's mouth and through his efforts relative thereto, he finds that upon tightening his lip, less vibrating space is provided within which the diaphragm can hit or beat against the anvil. With decrease in wave length and with corresponding increase in frequency, increase in tone pitch is achieved.

Structurally, and assuming the rubber diaphragm 18 to be initially tensioned to proper extent, the caller is now ready for use. Assume that the hunter is in the field. The caller 10 is fast on the knotted end 17A of cord 17. The hunter encounters a flock of turkeys. He thoroughly scatters the flock. It is now when he uses his caller to re-assemble the flock. Accordingly and without necessity of distracting his attention from the field, he seeks out the cord 17 with his hand, finds and grips the caller 10 at the end thereof and, quickly positioning it into the palm of his hand through the effective use of the hand-gripping recesses 16A, 16A, applies the caller to his mouth. This, with the face 11 uppermost, and with the neatly recessed face 12 disposed bottommost. He applies the diaphragm 18 against his bottom lip and presses this diaphragm, through the recess 12A, against the mitered edge 15B (Figure 3) of the sound anvil 15. When this is done, it will be found that at the same time, and through the same simple act of positioning the caller in his mouth, the user has nicely accommodated the shallow recess 11A of the top face 11 to the contour of his upper lip.

So applied, diaphragm 18 is quickly warmed by the lips and breath of the user. And since the front portion of this diaphragm will be positioned well within the mouth of the user, it is almost immediately brought to operating temperature, and this even under the most adverse of cold weather conditions.

With fixed air column or tonal chamber, the pitch of the caller 10 remains substantially constant, regardless of the variations of unit quantity of air drawn through the openings 14A in the back member 14. With fundamental tone constant, volume is controlled by the quantity and rate of flow of air drawn through the caller through the lips of the user, coupled with muffling the open end of the sound chamber by manipulation of his hand or hands over back 14. The different sounds or notes employed are produced by the lower lip, mouth and tongue of the operator. He endeavors to "form" the sound with his mouth, at the same time drawing air through the caller. He draws in this air at degree of volume which he wants, to produce a call which is loud or soft, as required. With my caller this audible sound can be produced only by drawing the air inwardly through the caller, into the lungs of the operator.

I have found that for some reason as yet not fully understood by me, the use of two thicknesses of membrane 18, each of which folds is extremely thin, gives markedly superior results to those achieved upon the use of but a single fold of membrane material, but which has the same over-all thickness. I do not know why this is; but to a certain extent I am of opinion that greater flexibility is imparted by the two-ply construction, whereby the diaphragm responds more sensitively to variations in the force with which the user, by his lips, draws air through the openings 14A and past the edge of the sound anvil 15.

It is apparent that in prolonged use the membrane 15, of rubber of some generally similar flexible material, will in all probability display some tendency to stretch. It is of course highly desirable that the diaphragm at all times be tautened to uniform tension, and to the choice of the user's preference. To achieve required adjustability of tension and at the same time to provide for effective use of two folds of the membrane material, I employ endless strips of membrane material, i. e. without cuts, the rubber being formed or molded on continuous section, the two folds thus resulting perhaps being best shown at 18C and 18D in Figures 3 and 6 and as well, in Figure 2. I lay the two folds 18C and 18D of membrane material 18 in superposed relation. In the two similar and terminal loops, one of which, loop 18E, is disclosed in Figures 2, 4, and 6, and which are thus formed at the ends of the superposed layers I insert suitable elongated pins 20, 20 formed of metal or other suitable material displaying substantial strength in shear.

Typically, the pins 20, 20 are formed of 20 gauge wire. They may of course, however, be of other diameter. These pins 20, 20 are received in corresponding right and left recesses or slots 21 and 22, which I dispose on the outer surfaces of opposite side rails 13, 13. Actually, I prefer to form these slots in the reinforcing backings 16, 16. These slots extend longitudinally along the exterior faces of the reinforcing backings 16, 16. To impart self-locking reception of pins 20, 20, therein I incline these slots away from the bottom face 12 and towards the top face 11, at an angle $\beta$ of approximately 15°. As just stated, this angle of inclination $\beta$ assures a self-locking characteristic on the part of the stretched rubber diaphragm 15. The slots 21 etc., referred to may be defined in any suitable manner as by slotting or cutting away suitable or inclined openings in the reinforcing backings 16, 16, or by applying projecting studs to the exterior surface of the reinforcing backings 16, 16.

Regardless of exactly how the slots 21, etc., are provided they are physically defined (as best seen in Figure 4) by projecting studs 23, 23 comprising front or inner studs and by like studs 24, 24 comprising rear or outer studs, disposed away from the user's mouth. As stated, these studs may either be applied to the caller or provided by cutting away material from the reinforcing backings 16, 16 which themselves are applied to the outer faces of the side rails 13, 13. These slots extend along the side of the caller 10, but need not be provided throughout the length of the pins 20, 20. It is sufficient that they be provided at the front and rear pintle-like extremities thereof.

Assume now that the flexible diaphragm or membrane 18, formed of rubber or other suitable flexible material, is freshly supplied and possesses full capability of retracting upon stretching. With such fresh membrane, I slip the pins 20, 20 through the loops 18E, 18E at the ends of the membrane, and then stretch the diaphragm to such extent that I can slip the pins over the edges of the upper and lower studs (Figure 4) 23, 24, which define the slots 21, 21. Because of the 15° angle $\beta$ on which these slots are angled, the pins are self-locking and, once they are slipped over the edges of the corresponding studs defining the slots, snap snugly into these slots. They are thereupon securely held into position. Thus mounted, the diaphragm 18 is tensioned to required extent across the bottom face 12 of the caller 10 and over the concave recess 12A provided therein, in properly spaced relation to the operating edge 15B of sound anvil 15. The pins are mounted in the slots which are closest to the bottom face 12.

When, during use and perhaps after aging, diaphragm 18 loses some of its resilience, so that some slackness is evidenced in its extent across the concave recess 12A, it thereupon approaches too closely the adjacent end 15B of the sound anvil 15. When this occurs I find it to be necessary to restore the initial relationship of diaphragm 18 to the anvil 15 by increasing the tension of the diaphragm. To do this I slip one of the pins 20 out of its slot on a selected side of the caller, and over into the corresponding slot 22, 22. Upon so doing proper tensioning is restored, and I condition the caller for renewed cycle of service.

When finally, further adjustment of the diaphragm 18 is required to restore it to good operating condition, I find it sufficient simply to slip that pin 20 which is in slot 21 on the other side of the caller, over into corresponding slot 22 on the same side thereof. The diaphragm 18 is now tensioned to its fullest extent. When further wear thereon is observed, it is then in order and becomes necessary to replace it by a new membrane. Upon such replacement the pins 20, 20 are removably locked in slots 21, 21, closest to the bottom face 12 of the caller.

It is apparent of course, that the number of sets of slots 21, 22, etc., is not critical. As desired, there can be three or more such sets of slots. In my experience, however, I find satisfactory operating conditions attend the use of two sets of slots.

As described to this extent, my new caller is fully operable. And following repeated and prolonged use it is apparent that the instrument may, from time to time, be adjusted for fullest, immediate and sensitive response to the most wide variety of calls within the range of the fundamental tone of the box-like structural container 10. But it is equally apparent that, standing as it does and following the teachings of my disclosure to this point, it is sensitive and delicate as concerns diaphragm 18. Without protection during periods of non-use, it is vulnerably exposed to the elements or to accidents. Being intended almost solely for use in the field, the caller is subjected to extremely rough usage. Rapid failure of the diaphragm 18 would almost inevitably occur, unless this latter be shielded except during the period of actual use. With diaphragm failure in the field, the caller is useless until repaired. Accordingly, I provide my caller with a protective cover, formed of light weight and light gauge metal or other suitable protective material, and indicated generally at A. That is, I shield the delicate part of my caller with a protective cover which, rugged itself, provides ample protection for the diaphragm 18.

This cover A comprises a frame made removably fast to the exterior of the container 10, to which frame I hingedly connect a membrane cover. This frame comprises two generally like end members 25, 26, one of which, member 25, is shown in perspective in Figure 7. Face 25A of this end member 25 (Figure 7) is closely adapted to the applicable dimensions of the related backing 16 of the corresponding side rail 13. In depth, however, and along the extent of the related side rail, it extends back only a distance sufficient to protect fully the diaphragm 18 and the adhesive strip 19 securing it to the bottom face 12.

The leading or front edges of the end plates 25, 26 are crimped as at 25B, 25B (Figure 1) over the front, tapered edges of the related reinforcing strips 16, 16, defining the abutments for the slots 21, etc.

In like manner and at 25C, 26C, I crimp the end plates over the edges of the bottom face 12 of the container 10. In generally like manner, the edges 25D, 26D of these end plates are crimped over the side edges of the top face 11 of the container 10. Finally, the edges 25E at the mouth-remote extremities of these end plates are crimped over and engage in corresponding slots 16B, 16B (Figures 2 and 4) extending transversely across the outer surface of the reinforcing backing 16, 16, at selected points immediate their length.

Each such end plate 25, 26, at its rearward, outermost, and lowermost extent (illustratively at junction of crimped edges 25E and 25C in Figure 7), terminates in an outwardly projecting bearing sleeve indicated generally at 25F and 26F, respectively. These bearing sleeves may be closed or open, as desired. In the embodiment shown I employ an open sleeve, which permits ready assembly of the cover.

As part of the cover I provide a cover plate proper 27, overlying diaphragm 18. I impart to this cover plate 27 a depth which is very slightly less than that of the end plates 25, 26. This depth is thus diminished since there is no requirement that this hinge member fit over the projecting ends defining the slot-forming studs 23, 23 at the front or mouth-adjacent end of the caller. The sole function of the cover plate 27 is to cover the diaphragm 18, in spaced relation thereto, when the caller is not in use. Thus, full protection from the elements, accidents or rough handling, is assured except when the front end of the caller is actually inserted in the mouth of the caller.

To mount the cover plate 27 from the end plates 25, 26, I crimp over the rear end of this plate at 27A, remote from the front end of the caller, turning the same about a hinge pin or pintle 28 which extends the full length of the hinge plate and projects slightly beyond the same at each end, for reception of these extending ends within the bearing sleeves 25F, 26F, respectively.

Any convenient mode of assembly of the cover element can be employed. Preferably, I elect to secure the hinge pintle of cover plate 27 in the corresponding bearing sleeve of one of the end plates, say bearing sleeve 25F of end plate 25. I next slip the second end plate 26 about the corresponding side and end of the caller. Then, as a unit, I slip the first end plate 25 and cover plate 27 into position about the other side and end of the caller. In so doing I engage the free end of the hinge pintle 28 into the bearing sleeve of end plate 26.

So mounted, the cover plate 27 can be folded back rapidly with a mere flick of the user's finger.

It is essential, however, that this multi-part cover be firmly locked in position, once it is mounted in assembled relation on the caller. To this end I provide studs 29, 29, disposed one intermediate the length of each side rail 13, 13 and their related reinforcing backings 16, 16. These studs each comprise an enlarged head disposed exteriorly of the caller, with a related shank portion. Conveniently, they may comprise ordinary upholsterer's tacks.

That stud 29 disposed to the right in Figure 1 and uppermost in Figure 2 (see also Figure 3) is adapted to have its shank portion play longitudinally along the related side rail 13, in a suitable elongated slot 30 provided therein. While there may be one such slot 30 for each side rail 13, I find satisfactory operation to be achieved where this slot is provided in but a single side rail.

To the inner, free end of the shank portion of each stud 29, 29 I secure a coiled spring 31. This spring serves to hold the enlarged heads of each stud 29, 29, disposed outermost, in compression and firmly against the related outer surface of reinforcing backings 16, 16.

When the end plates 25, 25 are snapped into position with crimped edges 25E, 26E engaging in corresponding transverse slots 16B, 16B in the reinforcing backing 16, 16, then these studs 29, 29 engage by their heads against the outer surfaces of these end plates and, in cooperation with the other crimped edges 25B, 25C, 25D and 26B, 26C and 26D of the respective end plates, serve to hold the cover plate firmly in position on the caller, in removable fashion.

To remove the cover in its entirety from the caller it is enough simply to pull the topmost stud 29 in Figure 2 outwardly against the resistance of the spring 31, free from engagement with the end plate 25, and then slide it rearwardly, to the left in Figure 2 and in slot 30, to an extent sufficient to permit the crimped end 25E of the end plate 25 to be swung outwardly from the caller 10, away from corresponding slot 16B, and about the frontmost edge of the corresponding reinforcing backing 16, whereupon the corresponding sleeve bearing 25F of the end plate 25 is freed from its engagement about the hinge pintle 28, and the end plate 25 can be completely removed. When this has been done the other end plate 26 can be disengaged from its corresponding stud 29 so that the end plate 26 and its related cover plate 27 can be readily removed.

As perhaps best shown in Figure 2, I prefer to provide a circular recess 29A of reduced diameter, along the extent of the shaft 29B of each stud 29. And I secure the spring 31 thereto in desired suitable manner, as by crimping. While of course it is entirely possible to solder the spring 31 at its ends to the shanks 29B of the related studs 29, I find from experience that this is too slow from an operating standpoint. On the contrary, the use of the indented recesses insures permanent locking in ready manner between spring and related studs.

My new caller can be readily manipulated by the user. No considerable basic skill or experience is required. After but a few attempts the novice can closely duplicate the many calls of the turkey or other bird for which the particular caller is designed, in close dependence and harmony upon the particular situation encountered in the field. My box-type structure possesses the basic sturdiness and simplicity which is characteristic of this type of caller, yet is capable of the aforesaid wide variety of tones. It is unique among this type of caller in that it is largely mouth-controlled. Its certainty, reliability and readiness in use under wide extremes of operating conditions distinguishes it markedly from known mouth-operated diaphragm-type callers, of which the so-called wing-bone or green-leaf callers are typical.

The cover on the caller protects the rubber diaphragm 18 and pins 20, 20 as well as the grooves or slots 21, etc. provided therefor which otherwise would be exposed to injury and accidental damage. The cover is removable to facilitate ready renewal of diaphragm 18. A hinge cover plate, part of the cover, also protects the flat open end of the diaphragm from injury and damage when the caller is not in use. A safety catch is provided as part of the caller attached to a serviceable flexible cord which in turn is attached to the rear end of the caller to be fastened to the operator's shirt pocket as a safety measure to protect accidental loss or theft to the caller.

It is apparent from the foregoing that the soft wood ply employed on the inner side of the caller tends to soften and mellow the sound produced. On the contrary, the hard wood or maple exterior ply employed on the outside of the caller insures a hard finish, effectively withstanding wear and imparting added strength to the structure.

The dark color of the mahogany central ply provides an ideal indicator for locating the diaphragm on the center of the anvil, when installing a new diaphragm.

My all-weather caller can be effectively used under drastic extremes of weather conditions, and can be instantaneously used even when the hunter has been chilled by prolonged exposure to extreme cold. This is because the working part of the caller is inserted in the mouth, and the thin membrane or diaphragm is immediately brought to body temperature for each call. Thus reliable calls can be produced in freezing weather. My caller is readily capable of producing sounds which are loud enough for satisfactorily calling birds when the wind is high or at ranges upwards of one-half of a mile, while it can be sensitively modulated downwardly to calls soft enough to be realistic to a bird no more than ten feet away, hidden in the brush. The caller is both weather-resistant and theft proof, as heretofore pointed out. It is simple to replace a new diaphragm 18 when required, while short of this, the diaphragm can be readily adjusted for maximum results at any stage of use. A quick call or fast answer to the live turkey is made readily possible through the use of my caller. A few deft motions places the caller in the mouth of the operator, ready for use. The body of the caller itself is nicely curved for comfortable fit in the hand of the operator. No slippage results, and the caller readily positions itself naturally in the hand of the user, whether he be right or left handed. Not only do the adjustment of the pins 20, 20 in the slots 21, etc., permit adjustment for wear, but they also permit the user to adjust diaphragm 18 to vary slightly the emitted sounds in close correspondence to his particular preference in calls.

All these, as well as many other highly practical objects and advantages attend, the practice of my invention.

The caller which I have disclosed is primarily intended for hunting wild turkeys. And proportions and dimensions empirically arrived at were determined upon with reference to duplication of the characteristic turkey calls. It is of course possible, according to the teachings of my disclosure, however, so to dimension and proportion the caller, again by empirical determination, as to duplicate the call of almost any other fowl for which the caller is intended.

It is apparent from the foregoing that once the broad aspects of my invention are disclosed, many embodiments thereof will readily suggest themselves to those skilled in the art. And that as well, many modifications of the present embodiment will likewise readily come to mind. Accordingly, I intend the foregoing disclosure to be considered as purely illustrative, and not by way of limitation.

I claim:

1. A box-type caller for game birds proportioned and dimensioned to emit upon use, the characteristic call of the particular wild fowl for which it is intended, and including as component parts thereof: a fixed and enclosed sound chamber defined by a generally rectangular and somewhat elongated box-like structure open at one end thereof; an acutely-angled sound anvil disposed across and nearly closing said open end of said structure, and adapted to be applied to the mouth of the user; and a flexible diaphragm extending across said anvil in spaced relation thereto; said box structure having openings in the mouth-remote end thereof for the admission of energizing air under the breath-pull of the user.

2. A hand-size, box-type turkey caller capable of emitting almost any desired one of the many calls of the wild turkey, and including a box-like structure of elongated configuration defining a fixed sound chamber, having an opening at one end for the admission of energizing air upon the mouth-pull of the user; a sound anvil extending, at a sharp angle approximating 47° to that face of the caller which is uppermost in use, across the box-like structure and downwardly in a direction towards the front or mouth end of the caller; and a flexible diaphragm extending across the mouth-adjacent end of the anvil in closely spaced relation thereto, for vibrating thereagainst and thereby producing mouth- and diaphragm-modulated calls when the user, by mouth, pulls air through the sound chamber.

3. A box-type wild turkey caller comprising an oblong structure defining a fixed sound chamber and, having openings at one end, the other end thereof being shaped and contoured for ready application to the mouth of the user; and vibrating means nearly closing the mouth-end of said box-like structure, and including a sound anvil, for permitting variations of the box-emitted characteristic or fundamental tone and a hinged protective cover plate normally overlying the diaphragm when not in use.

4. A hand-size, box-type turkey caller capable of emitting almost any desired one of the many calls of the wild turkey, and including an oblong structure defining a fixed sound chamber and having an opening at one end for the admission of energizing air upon the mouth-pull of the user; a sound anvil extending, at a sharp angle of approximately 47° to that face of the caller which is uppermost in use, across the box-like structure and downwardly in a direction towards the front or mouth end of the caller; and a diaphragm comprising two superposed thicknesses of thin flexible membrane material stretched across the mouth-adjacent end of the anvil and spaced from but sufficiently close thereto as to render it capable of vibrating thereagainst for production of mouth- and diaphragm-modulated calls at such times as the user, by mouth, draws air through the sound chamber defined by the box-like structure.

5. A hand-size, box-type turkey caller structure defining an oblong-shaped, fixed sound chamber and having an opening at one end thereof for the intake of energizing air upon the mouth-pull of the user; a sound anvil approximately 1 1/16 of an inch in width and extending, at a sharp angle to that face of the caller which is uppermost in use, completely across the box-like structure and downwardly towards the front or mouth end of the caller; and a flexible diaphragm extending across the mouth-adjacent end of the anvil in closely spaced relation thereto, for vibrating thereagainst and thereby producing mouth- and diaphragm-modulated calls when the user by mouth pulls air through the sound chamber, the said anvil, at the mouth end of the caller having a mitered longitudinal edge, approximately 1/8 of an inch in thickness or depth, facing said diaphragm, and along the transverse center of which exposed edge of the anvil, the related edge of the diaphragm is centered.

6. A hand-size, box-type turkey caller including a rectangular and somewhat elongated box-like structure defining a fixed sound chamber and having an opening at one end for the admission of energizing air upon the mouth-pull of the user; a sound anvil extending, at a sharp angle of approximately 47° to that face of the caller which is uppermost in use, across the box-like structure and downwardly in a direction towards the front or mouth end of the caller; and a diaphragm comprising two superposed thicknesses, each of approximately 0.003 inch in depth, of thin flexible membrane material stretched across the mouth-adjacent end of the anvil and spaced from but sufficiently close thereto as to render it capable of vibrating thereagainst for production of mouth- and diaphragm-modulated calls at such times as the user, by mouth, draws air through the sound chamber defined by the box-like structure.

7. An oblong box-type turkey caller partially closed across one end thereof by an acutely-angled sound anvil provided with a mitered end at the mouth-adjacent extremity thereof, thereby terminating in a sharp edge displayed towards the mouth end of said caller while presenting, parallel with the longitudinal axis of said caller, a narrow face which is defined by said mitered end, said mitered end being centrally marked across its longitudinal extent; and a flexible, vibratory diaphragm disposed across said caller in closely spaced relation to said sound anvil and having its mouth-adjacent edge in substantial alignment with said central mark on the mitered edge of said anvil.

8. A wild game caller which is operable by the user drawing in his breath through the caller when the latter is partly inserted in the user's mouth, and comprising an elongated box-like structure open at the mouth-remote end and having an acutely-angled sound anvil partially closing the mouth-adjacent end thereof, and across which passes the indrawn air towards the user's mouth and provided with a generally semi-circular recess at the mouth-adjacent end of that part of the box-like structure which is bottommost when the caller is applied to the mouth of the user; and a flexible diaphragm adjustably tensioned across said recess in closely spaced relation to said sound anvil, for producing mouth varied sound effects with the air drawn across the latter.

9. A turkey caller comprising a sound box of generally rectangular cross section and having top and bottom face members thereon with caller considered as applied to the mouth of the user; an acutely-angled sound anvil extending completely across and partly closing the mouth-adjacent end of said sound box; said box having a mouth-receiving, generally semi-circular, recess extending across the mouth-adjacent end of the bottom member thereof; side rails defining the sides of said box and having angled, longitudinally extending slots disposed in the mouth-adjacent ends thereof; a flexible diaphragm adjustably tensioned across said recess and in closely spaced relation to said anvil; and means at the respective ends of said diaphragm for adjustably and removably locking in said slots, thereby holding said diaphragm in proper tensioned and spaced relation to said anvil.

10. In a bird caller which includes an oblong box-type sound chamber partially closed by a sound anvil and adapted to be excited by a flexible diaphragm adjustably tensioned thereon in closely spaced relation to said anvil, and in cooperation therewith: a protective cover for said diaphragm removably mounted on said sound chamber and having, as part thereof, a hinged cover plate normally covering said diaphragm in close relationship, but swingable away from said diaphragm to expose the latter, to condition the caller for service.

11. As part of a turkey caller having an oblong box-like sound chamber with component sound anvil and a removable and adjustably tensioned, delicate and flexible diaphragm, and including side rails as component parts defining said sound chamber; a cover assembly for said diaphragm comprising end plates removably received on the side rails of said sound chamber and a cover plate hingedly received between said end plates, the said end plates and cover plate being removably secured together in assembly; and spring-biased studs extending through said side rails and across the sound chamber and removably and compression-gripping the cover assembly in operable association with said sound chamber and normally covering and protecting said diaphragm.

12. A bird caller capable of producing a variety of calls responding to a single characteristic basic tone, comprising a box-like structure partly open at its mouth-remote end and partially closed at its mouth-adjacent end by a sound anvil which is sharply angled to the longitudinal extent of said caller, said box-like structure having a recessed opening in the side thereof adjacent the mouth-adjacent end of said sound anvil; and a flexible diaphragm removably and adjustably fast to said box-like structure and extending across said sound opening with one longitudinal edge thereof extending along and in closely and predetermined spaced relation to the mouth-adjacent edge of said sound anvil, for vibratory cooperation therewith.

13. A lip-operated wild game caller having utility only when the operator, through his lips, draws in air therethrough; and comprising a generally box-like structure defining a fixed sound chamber generally rectangular in section and having openings therethrough at a lip-remote and transversely terminal closure, for the admission of air which is drawn in through the caller towards the operator's lips, the lip-adjacent end of the caller being shaped and contoured for ready application of the caller to the lips of the operator; a generally plane-surfaced diaphragm extending across an opening near the lip-adjacent end of said structure; and a sound anvil damming the interior of said structure; and directing exterior air through said structure and across an anvil edge closely adjacent to and parallel to the plane of said diaphragm, lip adjustment of the diaphragm relative to the anvil edge, by varying the spacing therebetween, permitting variation in the emitted tone of the caller.

References Cited in the file of this patent

UNITED STATES PATENTS

| | | |
|---|---|---|
| 693,693 | Edwards | Feb. 18, 1902 |
| 752,447 | Gebert | Feb. 16, 1904 |
| 1,593,026 | Madle | July 20, 1926 |
| 1,860,710 | Gilbert | May 31, 1932 |
| 2,019,425 | Luce | Oct. 29, 1935 |
| 2,053,982 | Weiss | Sept. 8, 1936 |
| 2,056,623 | Scott | Oct. 6, 1936 |
| 2,126,858 | Zadek | Aug. 16, 1938 |
| 2,570,816 | Kimple | Oct. 9, 1951 |
| 2,584,549 | Carhart | Feb. 5, 1952 |
| 2,598,268 | Kendrich | May 27, 1952 |
| 2,700,316 | Gordon | Jan. 15, 1955 |